United States Patent
Nakamura et al.

(10) Patent No.: US 9,288,289 B2
(45) Date of Patent: Mar. 15, 2016

(54) PORTABLE DEVICE MAINTENANCE SUPPORT APPARATUS, SYSTEM, AND METHOD

(71) Applicant: YOKOGAWA ELECTRIC CORPORATION, Musashino-shi, Tokyo (JP)

(72) Inventors: Masafumi Nakamura, Musashino (JP); Ikuhiko Ishikawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 116 days.

(21) Appl. No.: 13/970,811

(22) Filed: Aug. 20, 2013

(65) Prior Publication Data

US 2014/0056173 A1 Feb. 27, 2014

(30) Foreign Application Priority Data

Aug. 22, 2012 (JP) ................................. 2012-183090

(51) Int. Cl.
*H04L 29/06* (2006.01)
*G05B 19/418* (2006.01)

(52) U.S. Cl.
CPC ............ *H04L 69/18* (2013.01); *G05B 19/4185* (2013.01)

(58) Field of Classification Search
None
See application file for complete search history.

(56) References Cited

U.S. PATENT DOCUMENTS

| | | | |
|---|---|---|---|
| 6,839,790 | B2 | 1/2005 | Barros De Almeida et al. |
| 6,859,755 | B2 * | 2/2005 | Eryurek et al. ............... 702/183 |
| 7,581,434 | B1 * | 9/2009 | Discenzo et al. ............ 73/53.01 |
| 8,112,565 | B2 * | 2/2012 | Russell et al. .................. 710/62 |
| 2002/0143755 | A1 * | 10/2002 | Wynblatt et al. .................. 707/3 |
| 2006/0282580 | A1 | 12/2006 | Russell, III et al. |
| 2007/0183108 | A1 | 8/2007 | Uhlenberg et al. |
| 2009/0046732 | A1 * | 2/2009 | Pratt et al. ..................... 370/406 |

FOREIGN PATENT DOCUMENTS

| | | |
|---|---|---|
| CN | 101171578 A | 4/2008 |
| CN | 101375480 A | 2/2009 |
| JP | 2005-512219 A | 4/2005 |
| JP | 2005-522069 A | 7/2005 |
| JP | 2005-318246 A | 11/2005 |
| JP | 2008-546116 A | 12/2008 |
| JP | 2009-525023 A | 7/2009 |
| WO | 03/050625 A2 | 6/2003 |
| WO | 03/079125 A2 | 9/2003 |
| WO | 2006/133308 A1 | 12/2006 |
| WO | 2007/087571 A1 | 8/2007 |

* cited by examiner

*Primary Examiner* — Huy D Vu
*Assistant Examiner* — Hong Shao
(74) *Attorney, Agent, or Firm* — Sughrue Mion, PLLC

(57) ABSTRACT

A portable device maintenance support apparatus includes one set of terminals configured to connect to a hybrid communication network performed based on any one of a plurality of protocols, by a compound signal in which an analog signal is superimposed with a digital signal including at least device information, the hybrid communication network being performed between the portable device maintenance support apparatus and a field device, the one set of terminals being common to the plurality of protocols.

16 Claims, 9 Drawing Sheets

PORTABLE DEVICE MAINTENANCE SUPPORT APPARATUS, SYSTEM, AND METHOD

BACKGROUND OF THE INVENTION

1. Field of Art

The present invention relates to a portable device maintenance support apparatus, system, and method. More specifically, the present invention relates to a portable apparatus, system, and method preferable for maintenance work such as inspection and adjustment of field devices at the installation location thereof.

The present application claims priority based on Japanese Patent Application No. 2012-183090, filed on Aug. 22, 2012, which is included herein by reference.

2. Background Art

FIG. 8 is a system configuration diagram of an example of a conventional instrumentation system 50. Specifically, FIG. 8 is a system configuration drawing showing an example of an instrumentation system in a control plant such as a petroleum, chemical, steel, paper pulp, gas, LNG, electrical power, water environment, pharmaceuticals.

In FIG. 8, field devices 1 such as temperature transmitters, flow gauges, pressure transmitters, or valve positioners are connected to an upstream control system 3 (also referred to as an upstream system) via an I/O module 2.

The field devices 1 that detect various physical quantities transmit process values. For example, a field device 1 performs hybrid communication by a compound signal, in which a digital signal that includes device information is superimposed onto a 4 to 20 mA analog signal.

In this case, a field device 1 and the control system 3 that perform hybrid communication are basically connected in a one-to-one relationship. The control system 3, based on process values and device information transmitted and input from the field device 1, controls an actuator of a valve or the like.

In the case in which a parameter of a field device 1 is accessed from the control system 3, or in which device information or the like is transmitted from a field device 1 to the control system 3, the digital signal superimposed onto the 4 to 20 mA analog signal is used to perform the desired data receiving and transmitting, in accordance with a prescribed hybrid communication transmission scheme.

Hybrid communication protocols include Foundation® Fieldbus, Profibus®, HART®, MODBUS®, and the like, data receiving and transmitting being performed in accordance with each communication rule.

At the installation location of the field devices 1 constituting the instrumentation system 50 shown in FIG. 8, the hand-held communication and diagnostic device 22 (FIG. 9) as described, for example, in the Published Japanese Translation of the PCT Application 2005-522069 has been proposed as an apparatus for use in maintenance work such as inspection and adjustment of the field devices 1.

In FIG. 9, the hand-held communication and diagnostic device 22 has three network connection terminals 24a, 24b, and 24c. Specifically, the hand-held communication and diagnostic device 22 has two positive terminals (24a and 24c) and one common terminal (24b). The positive terminal 24a and the common terminal 24b are used to connect the hand-held communication and diagnostic device 22 to a HART network. The positive terminal 24c and the common terminal 24b are used to connect the hand-held communication and diagnostic device 22 to a Foundation Fieldbus (sometimes abbreviated FF hereinafter) network.

FIG. 9 shows, as one example, the case in which one of the terminals of a field device 1 is connected to the positive terminal 24a, and another terminal thereof is connected to the common terminal 24b.

When the hand-held communication and diagnostic device 22 is operating connected in a HART process control loop, it is necessary to prevent sinking or sourcing of a direct current. Given this, a HART physical layer circuit (HARTMAU) 26 is designed so as to supply a voltage signal to the process control loop (not shown).

In order to satisfy intrinsic safety requirements in the FF, the hand-held communication and diagnostic device 22 must prevent injection of energy into the process control loop. To satisfy this requirement, an FF physical layer circuit (Fieldbus MAU) 28, for example, uses a shunt current regulator to sink a direct current of approximately 20 mA and modulate that current by approximately ±8 mA during message transmission.

These two protocol communication methods are basically different and mutually conflicting. For this reason, the circuit of the hand-held communication and diagnostic device 22 is constituted so as not to sink current in the HART process control loop and not inject energy into (apply a voltage to) the FF network.

Because these are different process control loops, separate connection circuits and media access circuits (HART physical layer circuit 26 and FF physical layer circuit 28) are provided in the hand-held communication and diagnostic device 22. For this reason, there is a possibility of the hand-held communication and diagnostic device 22 being connected to a network that is different from the network to which a user wishes a connection. For example, there is a possibility that the user connects the HART physical layer circuit 26 to an FF network or connects the FF network to a HART physical layer circuit 26. In order to deal with a misconnection by the user, the hand-held communication and diagnostic device 22 is constituted so that, upon the initial connection, the physical layer circuits (MAUs) remain passive and do not modulate the network media.

The measurement circuits of the hand-held communication and diagnostic device 22 are constituted by a total of four measurement signal conditioning circuits, one for the HART physical layer circuit 26 and three for the FF physical layer circuit 28. The HART measurement circuit 30 and the Fieldbus measurement circuit 32 form circuits that can sink a small-amplitude, short-duration current from the network. The Fieldbus measurement circuit 32 is constituted by three measurement conditioning circuits (collectively, the Fieldbus measurement circuit 32) that can condition the voltage signals from the FF network terminals (24b and 24c) so as to measure the DC voltage value, the amplitude value of the communication signal, and the amount of noise on the network and the loop. The HART measurement circuit 30 is formed by a circuit that measures the DC voltage value on the network. These four signal conditioning circuits are connected to the control logic block 34. The control logic block 34 includes a multiplexer connected to an A/D (analog-to-digital) converter 36. The control logic block 34 can be accessed from a microprocessor 38 via a 16-bit parallel bus 40.

When the hand-held communication and diagnostic device 22 is first turned on, the A/D converter 36 alternately monitors the DC voltages of the connection terminals of both the HART and FF networks in accordance with a command from the microprocessor 38. In this state, the hand-held communication and diagnostic device 22 will not interfere with (for example, sink or source current to and from or source voltage to) the network (process control loop).

When the hand-held communication and diagnostic device 22 is not connected to a network, the measured voltage values at both loop connection terminals are substantially zero. When one of the MAU terminals is connected to the loop via the terminals 24a and 24b or 24c and 24b, a DC voltage will be measured at that MAU terminal, and a DC voltage will not be measured at the other MAU terminal. In the HART process control loop connection, a DC voltage of approximately 12 to 50V is measured, and in the FF loop connection, a DC voltage of approximately 9 to 32 V is measured.

With regard to the mechanical design of the loop connection terminals, the design is made so that it is not possible to connect both the HART and the FF media access units (MAU: media access units), that is, the HART physical layer circuit 26 and the FF physical layer circuit 28 to the processing loop at the same time. By doing this, even if a DC voltage is measured at one media access unit, a DC voltage is not measured at the other unit.

If a DC voltage is measured, the polarity of the DC voltage is sensed to verify whether the loop connection leads are properly connected. In particular, if the DC voltage measured between the common terminal 24b and one of the connection terminals 24a and 24c has a negative polarity, this means that the process loop connection leads are reversed. A message is sent to the host microprocessor (not shown) from the microprocessor 38, via the COM-1 terminal 41. The host processor displays the message, notifying the user to reverse the loop connection.

There is an overlap between the DC operating voltages used on both HART and FF process communication loops. Given this, the DC voltage alone cannot be used to reliably display the type of loop to which the hand-held communication and diagnostic device 22 is connected. Thus, in order to determine the type of loop, the hand-held communication and diagnostic device 22 actually measures the DC impedance of the process control loop (a considerable DC voltage value and the precise connection polarity).

The hand-held communication and diagnostic device 22 measures the DC impedance of the network by sinking a current of 1 mA for a very short duration of approximately 5 milliseconds. This interference signal generates a voltage pulse in the process control loop that is proportional to the DC impedance thereof. A clear-cut range of impedance exists between the HART and the FF process communication loops. The signal observed by the hand-held communication and diagnostic device 22 in response to the interference signal includes either the HART or the FF communication signal on the process control loop. Passing that communication signal through an appropriate low-pass filter to filter it enables observation of the short-duration pulse by the hand-held communication and diagnostic device 22.

The A/D converter 36 measures the voltage amplitude of the interference signal. The network impedance can be calculated from the measured voltage value. In the case of an FF network, the calculated value of impedance is approximately 50Ω, and in the case of a HART network the calculated value of impedance substantially exceeds 125 Ω.

In the case in which the detected loop type is different from the media access unit (MAU) connected to the hand-held communication and diagnostic device 22, an error message is sent to the host processor from the microprocessor 38, via the COM-1 terminal 41, thereby telling the user to change the network connection to the correct media access unit. If, however, the detected network, that is, the type of process control loop, is the same as the media access unit of the hand-held communication and diagnostic device 22, normal communication is continued.

Even during connection of the hand-held communication and diagnostic device 22 to the process control loop for the purpose of communication, the hand-held communication and diagnostic device 22 performs a plurality of diagnostic measurements, as necessary. For example, the microprocessor 38 periodically measures the DC loop voltage and verifies whether it remains precise and constant. If there is fluctuation in the DC loop voltage, the judgment is made that a problem has occurred in the process loop, or that the occurrence of a problem is imminent.

It is preferable that the Fieldbus measurement circuits 32 are caused to perform additional measurement diagnostics for an operating network or process control loop. The AC measurement circuit measuring the communication signal preferably is provided with a filter that enables measurement of the amplitude of message signals on the Fieldbus process control loop. Although a noise measurement circuit also can measure an AC voltage, if a low-pass filter is provided, it can measure the noise amplitude value in the range from 60 to 120 Hz.

In a hand-held communication and diagnostic device 22 having the above-noted constitution, the loop connection of a pair of loop connection terminals is automatically sensed. Additionally, the hand-held communication and diagnostic device 22 automatically senses an improper loop connection state, and can warn the user to reverse the polarity. With the hand-held communication and diagnostic device 22, the type of process control loop to which connection is made can be automatically sensed, enabling communication suitable thereto.

The hand-held communication and diagnostic device 22 can also perform a number of diagnostics of the process loop to which it is connected. Specifically, the hand-held communication and diagnostic device 22 can measure the DC network voltage, the FF message signal amplitude value, and the low-frequency noise amplitude value. Additionally, in relation to the FF diagnostics, the hand-held communication and diagnostic device 22 measures the amplitude of the Fieldbus signal strength and isolates it from a prescribed apparatus connected to the network. The user can diagnose the health of a device connected to the FF network or the loop or determine if a problem exists in a terminal of the network. Also, the hand-held communication and diagnostic device 22 can perform a plurality of FF diagnostics. The hand-held communication and diagnostic device 22 can also display information regarding a plurality of terminals provided on the FF network.

The hand-held communication and diagnostic device 22 also has a ROM 42, which is a non-volatile memory, a RAM 44, which is a volatile memory, a HART modem 45, a media access controller 46, a COM-2 terminal 47, and a debugging terminal 48 and the like. The memory within the hand-held communication and diagnostic device 22 is also used to store, along with a record of all retry queries, a full record of all detected message signal errors. These errors are associated with specific process apparatuses or receiver nodes in the process control loop. Given this, along with collection of information for the entire period of time, display is made of the status of connected nodes and the health of the loop.

In another example, the ROM 42 is a flash memory, into which are stored program commands that simplify higher-level diagnostic functionality. Such higher-level diagnostic functionality includes, for the purpose of supporting troubleshooting other apparatuses on the network, monitoring the control state of the loops operating in the FF part and/or simulating a particular functional block within the control loop.

However, in the conventional device described in Published Japanese Translation of the PCT Application 2005-522069, in addition to two different communication protocols being provided, two terminals are provided for connection to the prescribed network based on each of the communication protocols. As a result, it is necessary to take countermeasures to prevent misconnection, so that a user such as an on-site maintenance worker connects the prescribed network to the prescribed terminal.

If an incorrect connection is made between a terminal and a network, not only is a communication connection not made with the field device, but, in the worst case, the field device could be damaged.

SUMMARY OF THE INVENTION

A number of aspects of the present invention provide a portable device maintenance support apparatus, system, and method capable of reliably preventing misconnection to a network.

(1) A first aspect of the present invention is a portable device maintenance support apparatus including one set of terminals configured to connect to a hybrid communication network performed based on any one of a plurality of protocols, by a compound signal in which an analog signal is superimposed with a digital signal including at least device information, the hybrid communication network being performed between the portable device maintenance support apparatus and a field device, the one set of terminals being common to the plurality of protocols.

(2) In the first aspect of the present invention, the plurality of protocols may include at least two of Foundation Fieldbus, Profibus, HART, and MODBUS.

(3) In the first aspect of the present invention, the portable device maintenance support apparatus may further include a barrier circuit that is connected to the one set of terminals and that is configured to limit an input or output energy via the one set of terminals so as not to reach an ignition energy.

(4) In the first aspect of the present invention, the portable device maintenance support apparatus may further include a signal processing unit configured to perform frequency analysis of the compound signal and, based on the analysis result, to judge the standard type of the plurality of protocols.

(5) In the first aspect of the present invention, the portable device maintenance support apparatus may further include: a first communication modem configured to communicate using a first protocol, which is one of the plurality of protocols; a second communication modem configured to communicate using a second protocol, which is one of the plurality of protocols differing the first protocol; and a selector configured to connect the one set of terminals to one of the first communication modem and the second communication modem.

(6) In the first aspect of the present invention, the barrier circuit may include: first and second resistances connected in series with one of the one set of terminals; third and fourth resistances connected in series with another of the one set of terminals; and first and second diodes connected in parallel, with mutually opposite orientations, between the first and second resistances and the third and fourth resistances.

(7) In the first aspect of the present invention, the signal processing unit may be configured so that, from the plurality of protocols, when a first network protocol that is initially connected is used, the signal processing unit may control an input or output current via the one set of terminals to be smaller than that of the case in which a protocol other than the first network protocol is used.

(8) In the first aspect of the present invention, the signal processing unit may be configured to perform the frequency analysis for a certain period of time and calculate a communication frequency having a spectral density higher than a prescribed value and, based on the calculation result, to judge the standard type of the plurality of protocols.

(9) In the first aspect of the present invention, the portable device maintenance support apparatus may further include a control unit configured to control the portable device maintenance support apparatus, wherein the signal processing unit is configured to judge whether or not a first communication amplitude calculated from a maximum value and a minimum value of an input voltage to the one set of terminals is within a range of a second communication amplitude established by the standard type judged by the frequency analysis, and wherein the control unit is configured so that, if the first communication amplitude is within a range of the second communication amplitude, communication is established with the network connected to the one set of terminals.

(10) In the first aspect of the present invention, the signal processing unit may be configured to judge whether or not a fluctuation of a signal input or output from the one set of terminals is larger than a prescribed value, and the signal processing unit may be configured to notify the control unit of the judgment result, if the fluctuation is larger than the prescribed value.

(11) In the first aspect of the present invention, the signal processing unit may be configured to remove a noise component included in a signal input to the signal processing unit, to wave-shape the signal, and to output the signal to the control unit if the fluctuation is larger than the prescribed value.

(12) In the first aspect of the present invention, the portable device maintenance support apparatus may further include a manual switch that manually switches the connection of the one set of terminals to one of the first communication modem and the second communication modem.

(13) In the first aspect of the present invention, the portable device maintenance support apparatus may further include a measurement unit configured to detect whether or not a frame is input or output via the one set of terminals.

(14) In the first aspect of the present invention, the portable device maintenance support apparatus may include a control unit configured to judge, based on the frequency analysis result, whether or not a communication speed of the frame is larger than a prescribed value when the measurement unit detects input or output of the frame.

(15) In the first aspect of the present invention, the control unit may be configured to select a protocol accommodating high-speed communication from the plurality of protocols when the control unit judges that the frame communication speed is greater than the prescribed value, so that communication is performed using the selected protocol via the one set of terminals.

(16) In the first aspect of the present invention, the control unit may be configured to select a protocol accommodating low-speed communication from the plurality of protocols when the control unit judges that the frame communication speed is smaller than the prescribed value, so that communication is performed using the selected protocol via the one set of terminals.

(17) In the first aspect of the present invention, the control unit may be configured to select a protocol accommodating low-speed communication from the plurality of protocols, so that communication is performed using the selected protocol via the one set of terminals, when the measurement unit does not detect the input or output of the frame.

(18) In the first aspect of the present invention, the portable device maintenance support apparatus may further include an input/output block connected to the one set of terminals, wherein the input/output block includes a resistance connected only to the one set of terminals.

(19) A second aspect of the present invention is a portable device maintenance support system, including: a field device detecting a physical quantity; and a portable device maintenance support apparatus that includes one set of terminals configured to connect to a hybrid communication network performed based on any one of a plurality of protocols, by a compound signal in which an analog signal is superimposed with a digital signal including at least device information, the hybrid communication network being performed between the portable device maintenance support apparatus and the field device, the one set of terminals being common to the plurality of protocols.

(20) A third aspect of the present invention is a portable device maintenance support method including providing one set of terminals configured to connect to a hybrid communication network performed based on any one of a plurality of protocols, by a compound signal in which an analog signal is superimposed with a digital signal including at least device information, the one set of terminals being provided in a portable device maintenance support apparatus, the hybrid communication network being performed between the portable device maintenance support apparatus and a field device, the one set of terminals being common to the plurality of protocols, whereby maintenance and inspection of the field device are performed, via the hybrid communication network, the maintenance and inspection being made using the one set of terminals.

A number of aspects of the present invention enable reliable judgment of the protocol of a compound signal, without the occurrence of a misconnection to a network.

PREFERRED EMBODIMENTS

A first and second embodiments of the present invention will be described below, with references made to the drawings. The following descriptions of the first and second embodiments of the present invention are merely specific descriptions of the present invention as set forth in the attached claims and equivalents thereto, and are not for the purpose of imparting restrictions thereto, which will be clear to a person skilled in the art, based on the content of the present disclosure.

First, the first embodiment of the present invention will be described.

Figure 1:
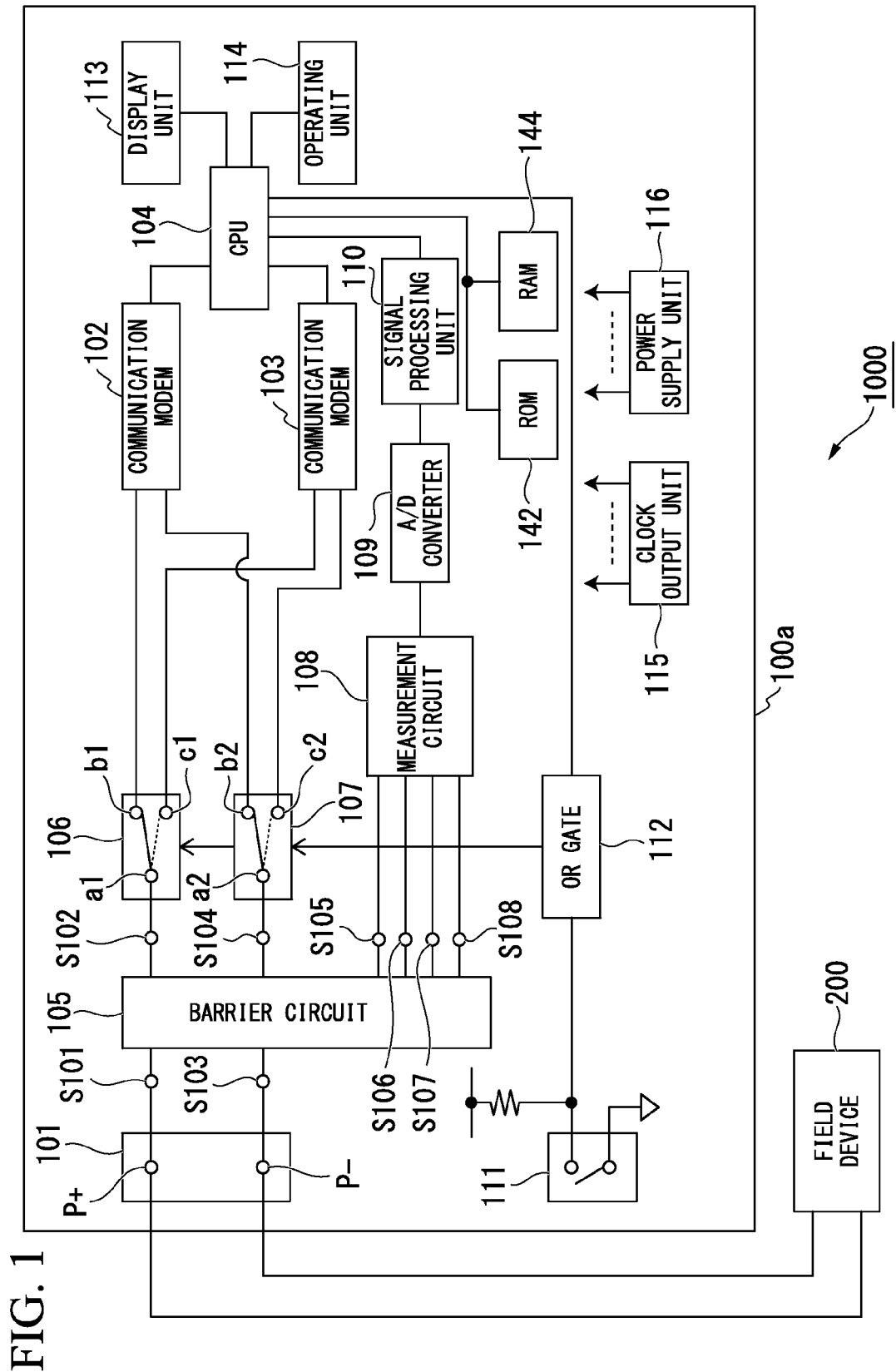
FIG. 1 is a drawing of the constitution of a portable device maintenance support system according to a first embodiment of the present invention.

FIG. 1 shows the constitution of a portable device maintenance support system 1000 according to the first embodiment of the present invention. The portable device maintenance support system 1000 has a portable device maintenance support apparatus 100a and a field device 200.

The portable device maintenance support apparatus 100a has a terminal block 101, connection terminals S101 to S108, communication modems 102 and 103, a CPU 104, a barrier circuit 105, selectors 106 and 107, a measurement circuit 108, an A/D converter 109, a signal processing unit 110, a manual switch 111, an OR gate 112, a display unit 113, an operating unit 114, a clock output unit 115, a power supply unit 116, a ROM 142, and a RAM 144.

In FIG. 1, the terminal block 101 is for connection to a communication network, and has a positive terminal P+ and a negative terminal P−. The terminal block 101 is used in common for communication networks of a plurality of standards. In FIG. 1, the positive terminal P+ is connected to one of the terminals of the field device 200, and the negative terminal P− is connected to another terminal of the field device 200.

The communication modems 102 and 103 are both used for field device network communication. The communication modem 102, of the above-described communication networks FF, Profibus, HART, MODBUS, and the like, accommodates the HART network. The communication modem 103 accommodates the FF network. A hybrid communication network is a network in which communication is performed using any one of protocols such as FF, Profibus, HART, and MODBUS, by switching a plurality of communication networks using these protocols.

Although the two communication modems 102 and 103 are used in the first embodiment as an example, three or more communication modems may be provided. The output terminals of the communication modems 102 and 103 are connected to the CPU 104.

The CPU 104, based on information input via the communication modems 102 and 103 and information input from the signal processing unit 110, performs automatic determination of the type of standard of the communication network. The CPU 104 feeds the determination result back to the selectors 106 and 107 as control signals, via the OR gate 112. The CPU 104 mainly performs application layer processing and, if necessary, performs data link layer processing.

The barrier circuit 105 controls the input/output of energy (voltage, current, power) and, in the case in which intrinsic safety and explosion-proof standards are considered, is connected as the next stage to the terminal block 101. That is, the barrier circuit 105 is disposed between the terminal block 101 and the selectors 106 and 107. Intrinsic safety and explosion-proof standards are standards in Japan that wireless devices are required to meet for use in an area specified as an intrinsically safe and explosion-proof area. The barrier circuit 105 is designed so as to withstand the maximum rated input in the associated network communication standard without damage to components.

Figure 2:
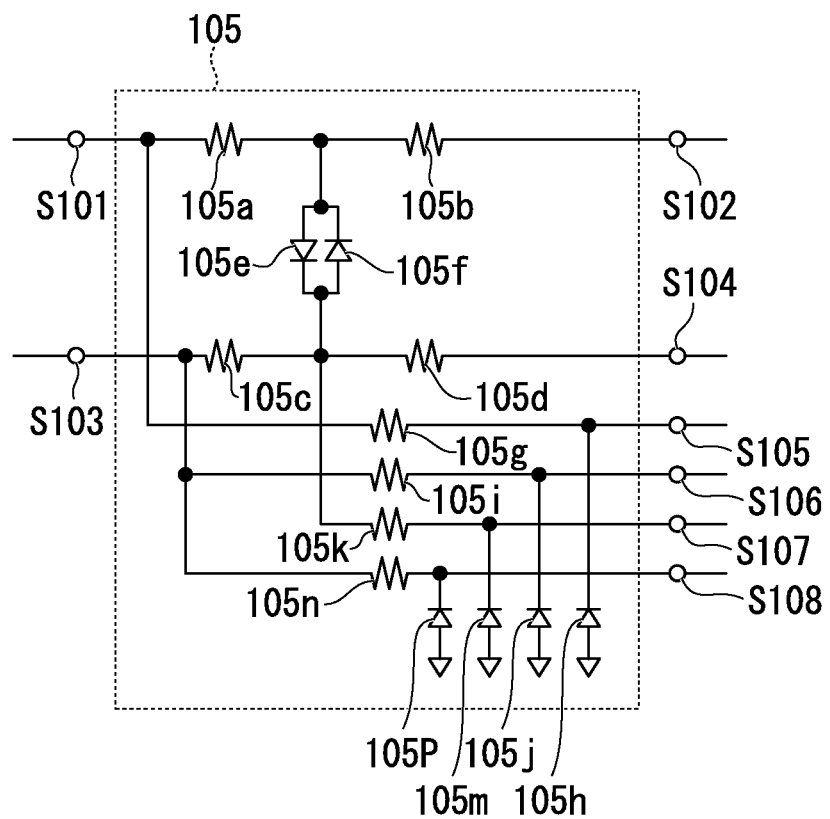
FIG. 2 is a specific circuit diagram of the barrier circuit in FIG. 1.

FIG. 2 is a specific circuit diagram of the barrier circuit 105. The barrier circuit 105 has resistances 105a, 105b, 105c, 105d, 105g, 105i, 105k, and 105n, and diodes 105e, 105f, 105p, 105m, 105j, and 105h.

FIG. 2 shows an example in which eight connection terminals S101 to S108 are connected to the barrier circuit 105.

Resistances 105a and 105b, which are used as current-limiting elements to reduce the current to a level at which there is no ignition by spark energy, are connected in series between the connection terminals S101 and S102. The resistances 105c and 105d, which are used as current-limiting elements, are connected in series between the connection terminals S103 and S104.

A parallel circuit is connected between the connection point between the resistances 105a and 105b and the connection point between the resistances 105c and 105d. This parallel circuit is formed by the two diodes 105e and 105f connected in parallel. The diodes 105e and 105f are connected in parallel so that polarities thereof are mutually opposite. The diodes 105e and 105f are used as voltage-limiting elements to reduce the voltage to a level at which there is no ignition by the spark energy.

The resistance 105g is connected between the connection terminals S101 and S105. The cathode of the diode 105h is connected to the connection point between the resistance 105g and the connection terminal S105. The anode of the diode 105h is connected to the common potential point.

The resistance 105i is connected between the connection terminals S103 and S106. The cathode of the diode 105j is connected to the connection point between the resistance 105i and the connection terminal S106. The anode of the diode 105j is connected to the common potential point.

The resistance 105k is connected between the connection point between the resistances 105c and 105d and the connection terminal S107. The cathode of the diode 105m is connected to the connection point between the resistance 105k and the connection terminal S107. The anode of the diode 105m is connected to the common potential point.

The resistance 105n is connected between the connection terminals S103 and S108. The cathode of the diode 105p is connected to the connection point between the resistance 105n and the connection terminal S108. The anode of the diode 105p is connected to the common potential point.

In a barrier circuit 105 having the above-noted constitution, the connection terminals S105 and S106 function as line voltage measurement terminals, and the connection terminals S107 and S108 function as line current measurement terminals. Also, the points at which the line voltage and line current are measured are not restricted to being the connection terminals S105, S106, S107, and S108, and a plurality thereof may be separately provided.

In FIG. 1, the selector 106 is constituted by a moving contact a1 and fixed contacts b1 and c1, and selectively connects the terminal block 101 to each of the communication modems 102 and 103. The selector 107 is constituted by a moving contact a2 and fixed contacts b2 and c2, and selectively connects the terminal block 101 to each of the communication modems 102 and 103. The selectors 106 and 107 are provided between the barrier circuit 105 and each of the communication modems 102 and 103.

The moving contact a1 of the selector 106 is connected to the connection terminal S102. The fixed contact b1 is connected to one input terminal of the communication modem 102. The fixed contact c1 is connected to one input terminal of the communication modem 103.

The moving contact a2 of the selector 107 is connected to the connection terminal S104. The fixed contact b2 is connected to the other input terminal of the communication modem 102. The fixed contact c2 is connected to the other input terminal of the communication modem 103.

In the initial state, the selectors 106 and 107 connect the communication protocol physical layer and the CPU 104 so that communication is possible with only one of the communication modems 102 and 103, with frequency analysis performing automatic standard type diagnosis of the protocol type and establishment of communication. The CPU 104 operates one communication protocol that is initially connected with an input/output current range (for example a current of 4 to 20 mA) that is smaller than the other communication protocol.

The measurement circuit 108 is connected to the communication protocol physical layer, via the connection terminals S105 to S108 of the barrier circuit 105. The output terminal of the measurement circuit 108 is connected to the A/D converter 109.

The A/D converter 109 has a sampling rate that is faster by, for example, approximately ten-fold than the communication bandwidth. The A/D converter 109 converts the analog signal from the final stage of the barrier circuit 105 to a digital signal and outputs it to the signal processing unit 110. The output signal from the A/D converter 109 is the basic information for distinguishing the standard type of the communication network connected to the terminal block 101.

The connection terminals S105 and S106 of the barrier circuit 105 are connected to the A/D converter 109 via the measurement circuit 108. The measurement circuit 108 detects a voltage that is associated with the terminal block 101. In detecting the current flowing in the bus, a differential amplifier (not shown) is used that determines the voltage between the resistances 105k and 105n (the potential difference between the connection terminals S107 and S108) connected in series with each line of the positive terminal P+ and the negative terminal P− of the terminal block 101, these resistances being provided for conversion of the current flowing in the bus to a voltage.

The signal processing unit 110 is constituted by elements such as a DSP and a CPU. The signal processing unit 110 performs processing such as wave-shaping by, for example, frequency analysis by FFT computation or digital filtering with respect to a signal that has been converted and output from the A/D converter 109.

Specifically, the signal processing unit 110 performs the following types of processing judgments.

(1) Frequency analysis over a given period of time (a fraction of the each assumed communication network frame time) and calculation of a communication frequency with a high spectral density are performed. Then, based on that calculation result, judgment is made of the standard type of the communication network. That is, if it is in the region of 30 kHz, the judgment of FF is made, and if it is 1 to 2 kHz, the judgment of HART is made.

(2) Calculation of the communication amplitude from the maximum value and the minimum value of the voltage input related to the bus current of the A/D converter 109 is performed. A comparison is made between this and the communication amplitude in accordance with the standard of the communication network obtained based on the frequency analysis in the above-noted (1) and, if it is within the rated range, notification is made to the CPU 104 so as to establish communication. The CPU 104 instructs the selectors 106 and 107 with a command signal, to make connection of the corresponding communication modem 102 or 103 to the terminal block 101. If the amplitude is far from the rated range, notification of abnormal communication is given to the CPU 104.

(3) Along with the processing of the above-noted (2), the fluctuation of the signals input and output from the terminal S101 is verified and, if the fluctuation is larger than a prescribed value, a notification is made to the CPU 104 that the bus line noise is large and that the condition is poor. If the fluctuation is greater than the prescribed value, for example, the CPU 104 does not use the protocol of the network currently connected to the terminal block 101 to communicate.

(4) Additionally, if in the above-noted (3) a determination is made that the bus line noise is larger than a prescribed value and that the condition is poor, the digital filter parameters are adjusted so as to remove the noise components included in the converted output from the A/D converter 109, that is, in the signal input to the signal processing unit 110, and perform wave-shaping. A wave-shaped signal that has few noise components is then output to the CPU 104. Doing this enables the CPU 104 to recognize the intended communication information transferred via the bus line.

Although the signal processing unit 110 performs the above-noted signal processing (1) to (4), if the CPU 104 has reserve computing capacity, a part of this processing may be performed by the CPU 104.

The manual switch 111 is provided to set the automatic judgment mode by the CPU 104 to the manual mode if necessary. That is, although the judgment of the type of standard of the network connected to the terminal block 101 is automatically judged by the CPU 104 based on the processing result of the signal processing unit 110, giving consideration to a certain selection of the communication, the arrangement allows manual switching. For example, by the user manually operating the manual switch 111, the connections of the selectors 106 and 107 are switched via the OR gate 112, and switching is done to a connection of the terminal block 101 to one of the communication modem 102 and the communication modem 103.

The manual switch 111 may be, for example, an insertion type DIP switch, and if the communication protocol to be used is established beforehand, the communication protocol may be fixed by connecting the terminal block 101 using a shorting switch. The status of the manual switch 111 is input, via the OR gate 112, as a control signal to the selectors 106 and 107.

The display unit 113 is connected to the CPU 104, and displays various information of the CPU 104. The operating unit 114 is connected to the CPU 104 and, for example, performs operations of setting the CPU 104 as the user observes the display screen of the display unit 113.

The clock output unit 115 outputs clocks of the required frequencies to each of the blocks such as the CPU 104.

The power supply unit 116 supplies electrical power of prescribed voltages required by each of the blocks such as the CPU 104.

The ROM 142 is a non-volatile memory connected to the CPU 104. A program that is executed by the portable device maintenance support apparatus 100*a* is recorded in the ROM 142.

The RAM 144 is a volatile memory connected to the CPU 104. The RAM 144 temporarily stores, for example, data that are received from the field device 200 by the portable device maintenance support apparatus 100*a*.

Figure 3:
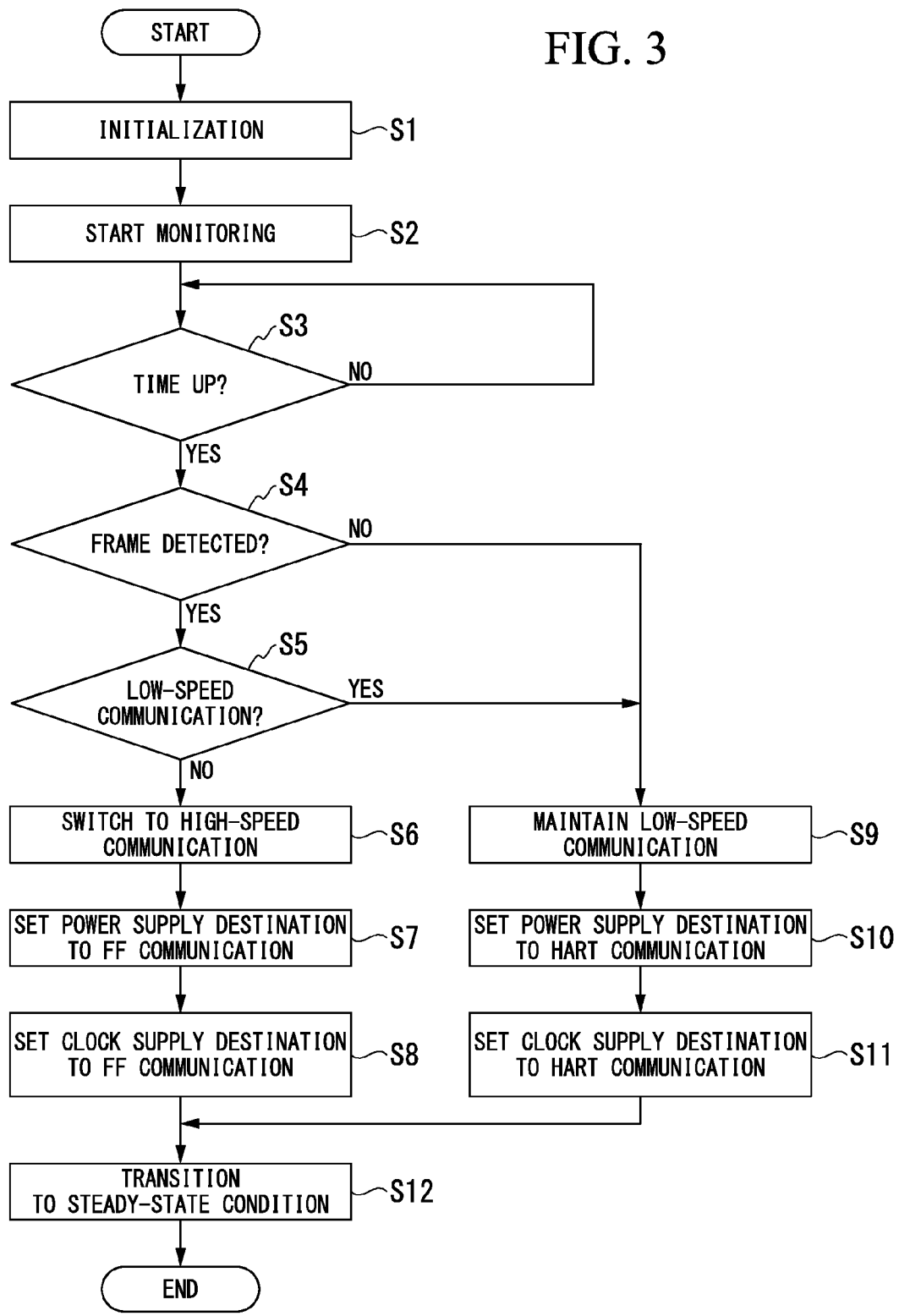
FIG. 3 is a flowchart describing the operation of the portable device maintenance support apparatus of FIG. 1.

FIG. 3 is a flowchart describing the operation of the portable device maintenance support apparatus 100*a* of FIG. 1.

First, at step S1, the portable device maintenance support apparatus 100*a* is placed in the initialized state. In the initialized state, the output clock frequency of the clock output unit 115 is set so as to accommodate the communication modem 102 (HART) that has a slow communication speed, and the communication modem 103 (FF) that has as fast communication speed. The power supply unit 116 sets the communication modems 102 and 103, the CPU 104, the measurement circuit 108, the A/D converter 109, and the signal processing unit 110 as destinations for the supply of power.

At step S2, the measurement circuit 108, the A/D converter 109, and the signal processing unit 110 detect whether there is communication on the communication network connected to the terminal block 101, and start signal frequency analysis.

At step S3, the measurement circuit 108 starts the monitoring timer that establishes a prescribed monitoring time of frames that are input and output via the terminal block 101. The frame monitoring time is set with consideration given to the characteristics of FF communication. In general, FF communication is bidirectional data communication, in which frames are normally sent with an interval of several milliseconds. Thus, if the inactive state continues, for example, for one second, a judgment is made that FF communication is not being done, so that a frame monitoring time setting of one second is sufficient. After waiting for the monitoring time to reach time-up, processing proceeds to step S4.

At step S4, the measurement circuit 108 judges whether or not a frame was detected within a prescribed monitoring time. If a frame has been detected, processing proceeds to step S5, and if a frame has not been detected, processing proceeds to step S9.

At step S5, the CPU 104, based on the frequency analysis results performed by the system formed by the measurement unit 108, the A/D converter 109, and the signal processing unit 110, compares the frame communication speed detected at step S4 with a prescribed value and makes a judgment of low speed or high speed. If the judgment is high speed, processing proceeds to step S6, and if it is low speed, processing proceeds to step S9.

At step S6, the CPU 104 switches the selectors 106 and 107 to enable the state that accommodates the communication modem 103 for FF, which is high speed.

At step S7, the CPU 104 stops the supply of electrical power from the power supply unit 116 to the blocks related to the HART communication system, and supplies electrical power to the blocks related to the FF communication system, that is, to the communication modem 103, the CPU 104, the measurement circuit 108, the A/D converter 109, and the signal processing unit 110.

At step S8, the CPU 104 sets the output clock frequency of the clock output unit 115 so as to accommodate the high-speed communication modem 103.

At step S12, the CPU 104 causes the portable device maintenance support apparatus 100*a* to go into the steady-state condition as an FF communication device, and the startup processing is completed.

At step S9, the CPU 104 switches the selectors 106 and 107, and enables the condition accommodating the HART communication modem 102, which is low-speed.

At step S110, the CPU 104 stops the supply of electrical power from the power supply unit 116 to the blocks related to the FF communication system, and supplies electrical power to the blocks related to the HART communication system, that is, to the communication modem 102, the CPU 104, the measurement circuit 108, the A/D converter 109, and the signal processing unit 110.

At step S11, the CPU 104 sets the output clock frequency of the clock output unit 115 so as to accommodate the low-speed communication modem 102.

Figure 4:
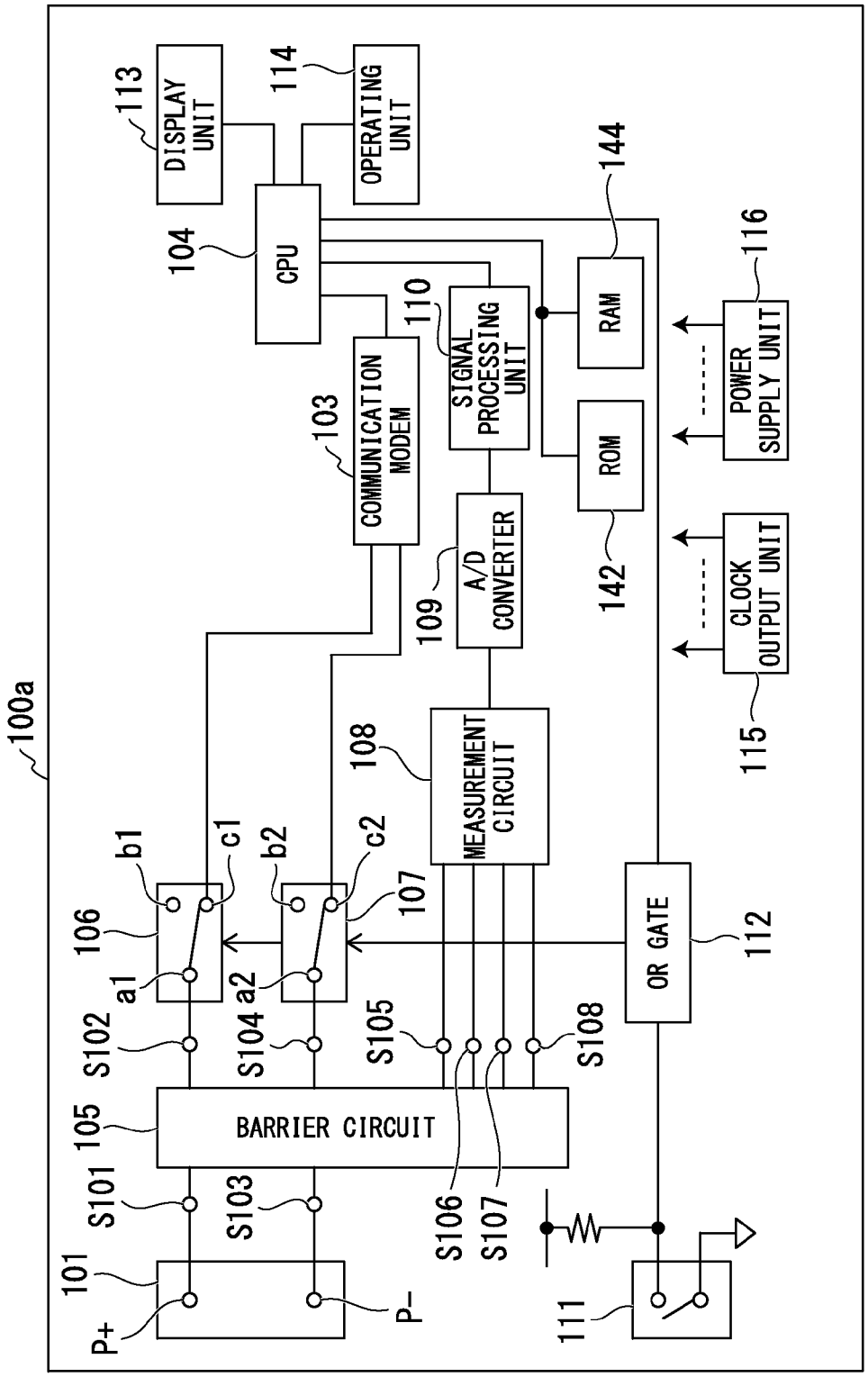
FIG. 4 is a block diagram describing the operating state of the portable device maintenance support apparatus after completion of the processing of step S7 in FIG. 3.

FIG. 4 is a block diagram describing the operating state of the portable device maintenance support apparatus 100a after completion of the processing of step S7. In FIG. 4, the communication modem 103 of the FF communication system is in the functioning state.

Figure 5:
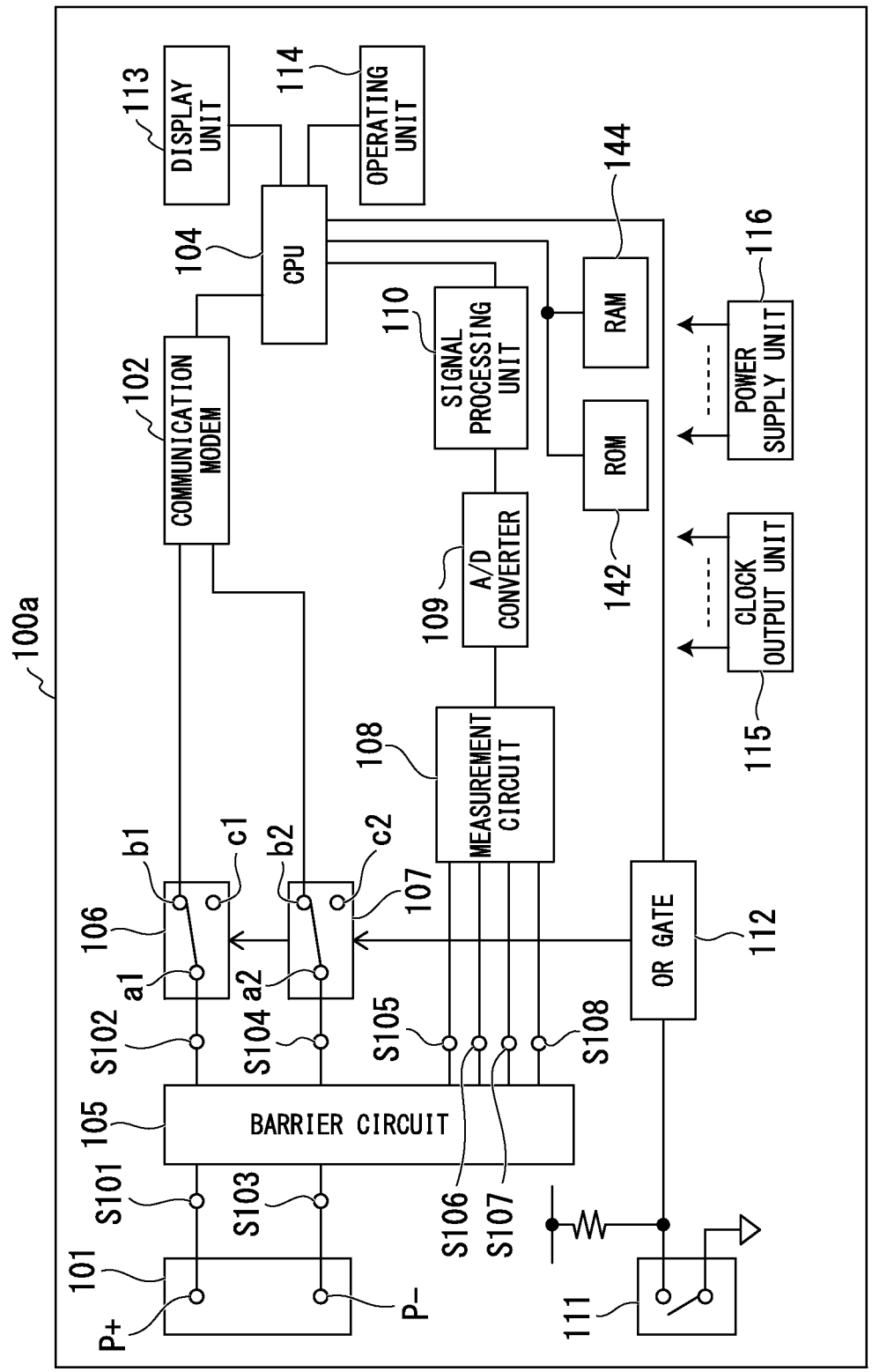
FIG. 5 is a block diagram describing the operating state of the portable device maintenance support apparatus after completion of the processing of step S10 in FIG. 3.

In contrast, FIG. 5 is a block diagram describing the operating state of the portable device maintenance support apparatus 100a after completion of the processing of step S10. In FIG. 5, the communication modem 102 of the HART communication system is in the functioning state.

As is clear from the foregoing description, in the portable device maintenance support apparatus 100a (FIG. 1) of the first embodiment, automatic recognition is done of FF communication and HART communication, based on the existence or non-existence of a communication frame in the communication network connected to the terminal block 101, and based on the analysis results of the signal processing unit 110. In accordance with the recognition result, the portable device maintenance support apparatus 100a functions as an FF communication device or a HART communication device.

Doing this eliminates the need to develop a communication network for each standard depending upon the type of each of the field devices, and also eliminates the troublesome task of inventory control.

After the frequency analysis, depending upon whether functioning as an FF communication device or functioning as a HART device is done, the clocks and power supply need only be supplied to the required locations for one thereof. This reduces the overall power consumption of the device, and avoids an adverse effect on the system.

Next, the second embodiment of the present invention will be described.

Figure 6:
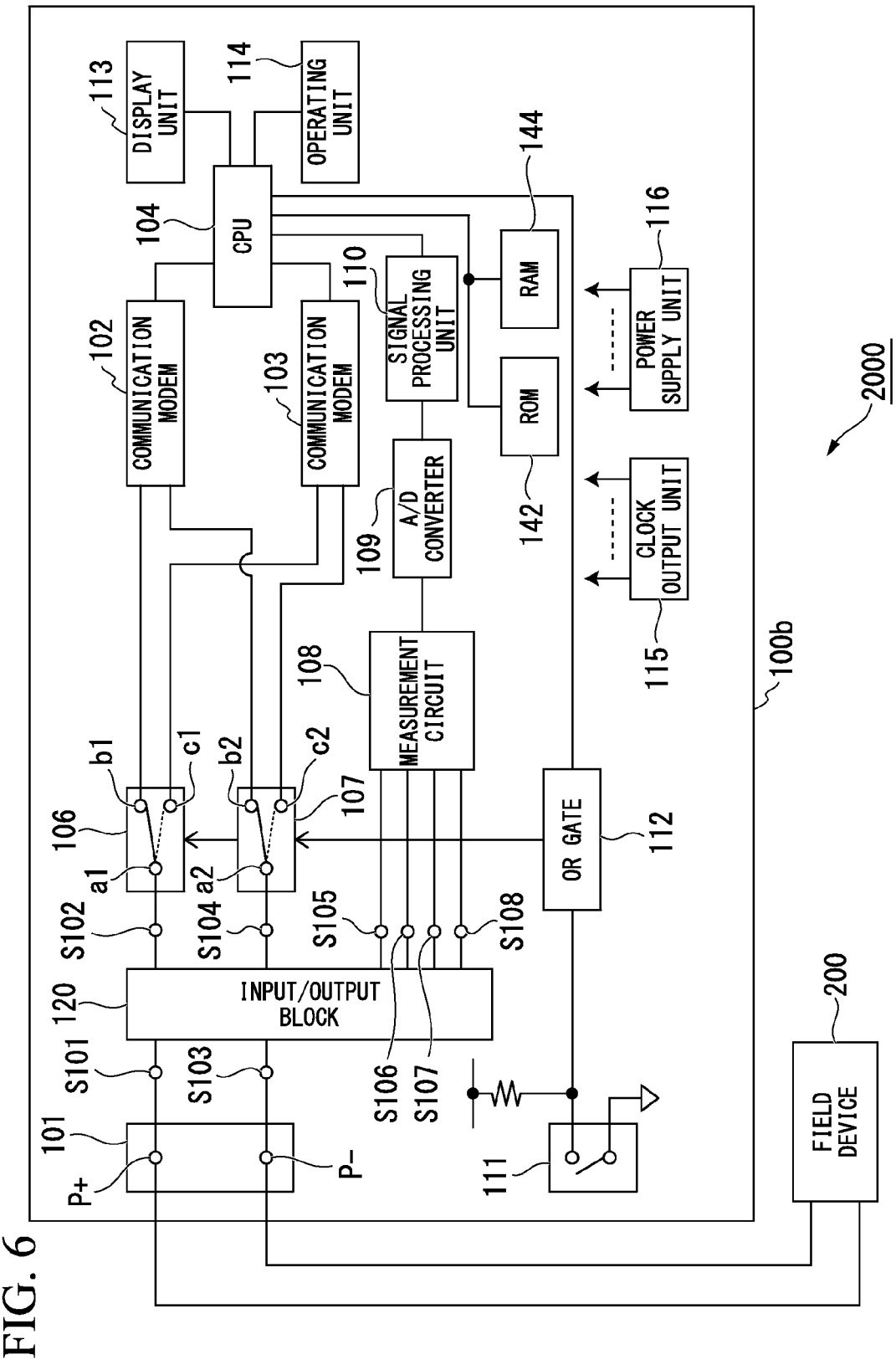
FIG. 6 is a drawing of the constitution of a portable device maintenance support system according to a second embodiment of the present invention.

FIG. 6 shows the constitution of a portable device maintenance support system 2000 according to the second embodiment of the present invention. The portable device maintenance support system 2000 has a portable device maintenance support apparatus 100b and a field device 200.

The portable device maintenance support apparatus 100b has a terminal block 101, connection terminals S101 to S108, communication modems 102 and 103, a CPU 104, an input/output block 120, selectors 106 and 107, a measurement circuit 108, an A/D converter 109, a signal processing unit 110, a manual switch 111, an OR gate 112, a display unit 113, an operating unit 114, a clock output unit 115, a power supply unit 116, a ROM 142, and a RAM 144.

Constituent elements in the second embodiment that are the same as in the first embodiment are assigned the same reference numerals and the descriptions thereof will be omitted.

In the portable device maintenance support apparatus 100a according to the first embodiment (FIG. 1), in consideration of intrinsic safety and explosion-proof standards, the example described is one in which the barrier circuit 105 is connected as the next stage to the terminal block 101. However, if the case of application to a non-intrinsically safe and explosion-proof standard is considered, the input/output block 120 may be connected instead of the barrier circuit 105, such as shown in FIG. 6.

In FIG. 6, the eight connection terminals S101 to S108 are provided in the input/output block 120, similar to the barrier circuit 105 according to the first embodiment. The connection relationship between the connection terminals S101 to S108 and various parts shown in FIG. 6 is the same as shown in FIG. 1.

Figure 7:
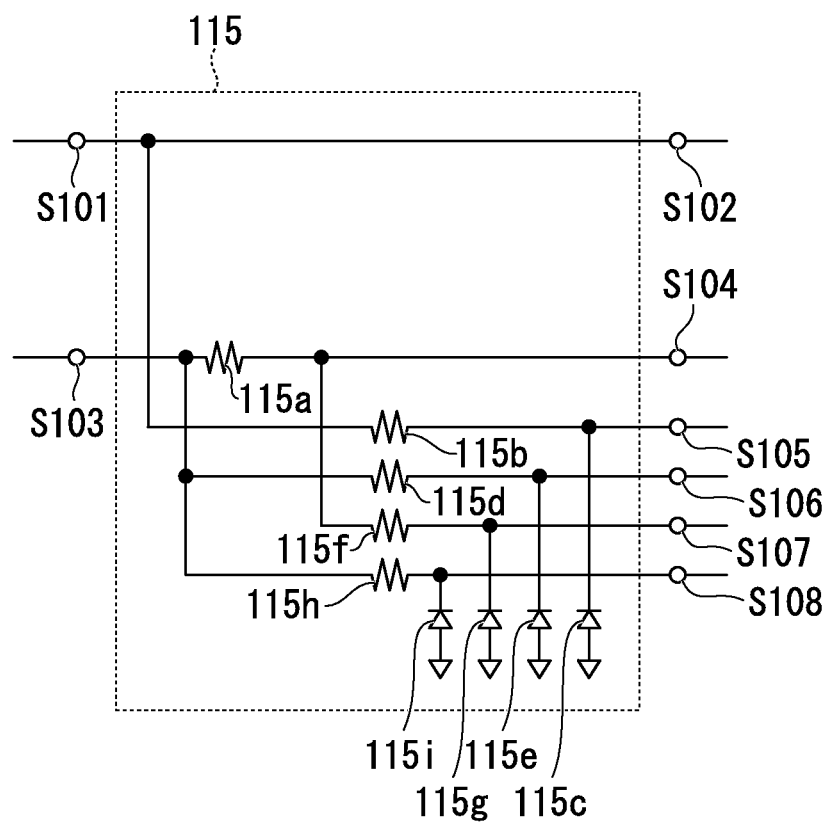
FIG. 7 is a specific circuit diagram of the input/output block in FIG. 6.
Figure 8:
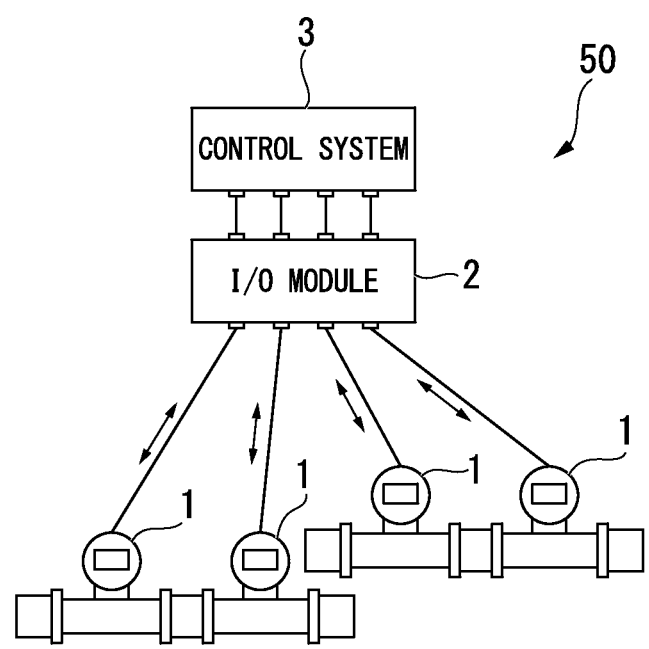
FIG. 8 is a drawing showing the system constitution of an example of a conventional instrumentation system.
Figure 9:
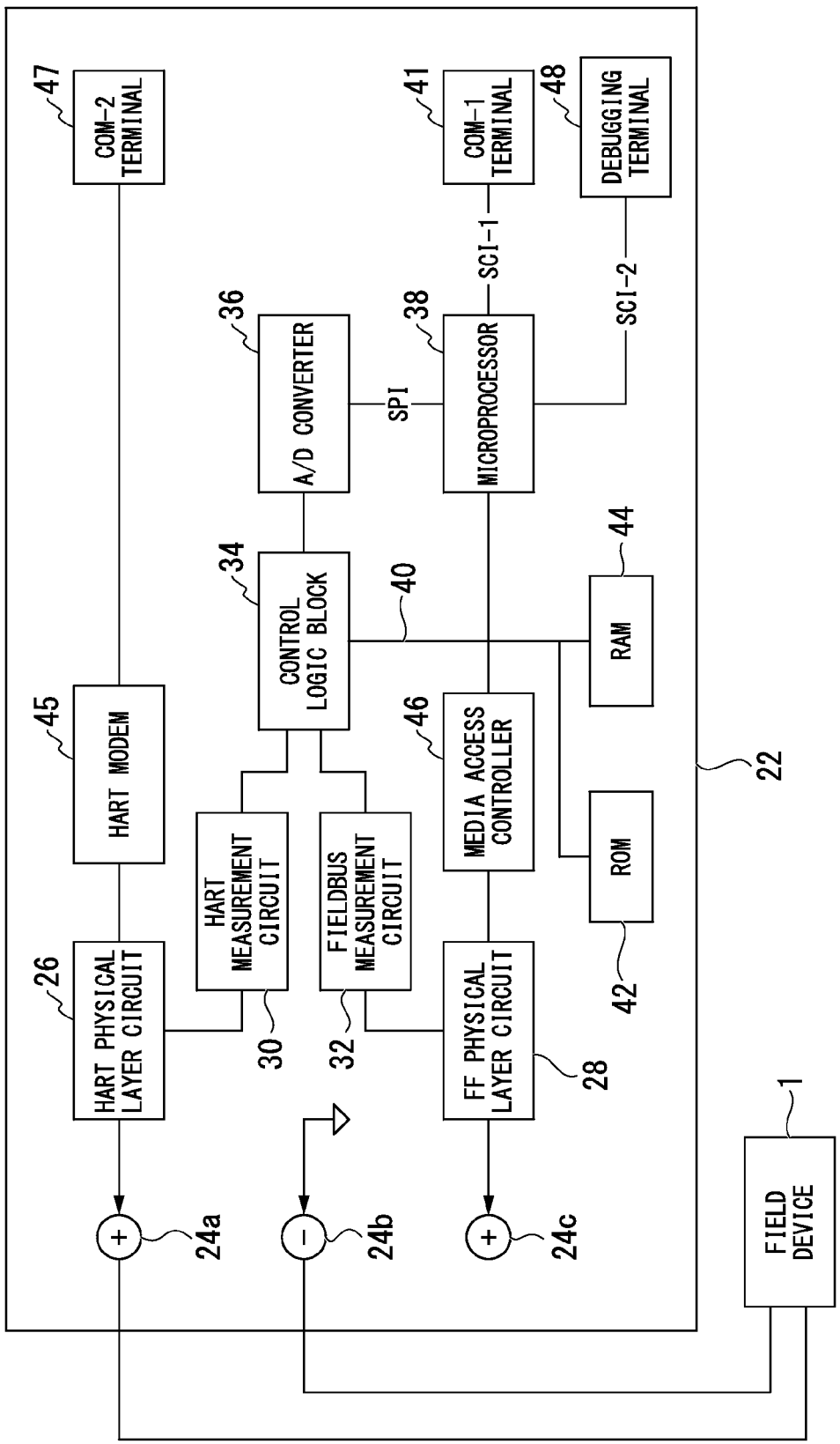
FIG. 9 is a block diagram showing an example of a conventional hand-held communication and diagnostic device.

FIG. 7 is a specific circuit diagram of the input/output block 120 of FIG. 6. The input/output block 120 has resistances 115a, 115b, 115d, 115f, and 115h, and diodes 115i, 115g, 115e, and 115c.

The input/output block 120 does not have elements to limit the input and output energy (voltage, current, and power) such as in the barrier circuit 105 according to the first embodiment.

That is, there is a direct connection between the connection terminals S101 and S102.

The resistance 115a is connected between the connection terminals S103 and S104.

The resistance 115b is connected between the connection terminals S101 and S105. The cathode of the diode 115c is connected to the connection point between the resistance 115b and the connection terminal S105. The anode of the diode 115c is connected to the common potential point.

The resistance 115d is connected between the connection terminals S103 and S106. The cathode of the diode 115e is connected to the connection point between the resistance 115d and the connection terminal S106. The anode of the diode 115e is connected to the common potential point.

The resistance 115f is connected between the connection point between the resistance 115a and the connection terminal S104 and the connection terminal S107. The cathode of the diode 115g is connected to the connection point between the resistance 115f and the connection terminal S107. The anode of the diode 115g is connected to the common potential point.

The resistance 115h is connected between the connection terminals S103 and S108, and the cathode of the diode 115i is connected to the connection point between the resistance 115h and the connection terminal S108. The anode of the diode 115i is connected to the common potential point.

In an input/output block 120 having the above-noted constitution, similar to the barrier circuit 105 according to the first embodiment, the connection terminals S105 and S106 function as line voltage measurement terminals, and the connection terminals S107 and S108 function as line current measurement terminals. Also, the points at which the line voltage and line current are measured are not restricted to being the connection terminals S105, S106, S107, and S108, and a plurality thereof may be separately provided.

The reason this block is noted as the input/output block 120 in FIG. 7 is that, in the portable device maintenance support apparatus 100b of the second embodiment of the present invention as well, there are cases in which, when performing maintenance and inspection of a HART communication network, a signal source (not shown) superimposes a prescribed signal onto the HART communication network.

According to the first and second embodiments of the present invention, because there is one set of terminals for making connection to a communication network, when performing on-site maintenance and inspection, even if the communication network protocol has not been verified, connection can be done simply, without thinking about the type, so that the misconnection problem in conventional apparatuses such as described in Published Japanese Translation of the PCT Application 2005-522069 does not occur.

The scope of application of the present invention is not restricted to the above-noted first and second embodiments, and the present invention can be widely applied to field devices having a function of communicating via a communication line.

As described above, according to a number of aspects of the present invention, it is possible to provide a portable device maintenance support apparatus capable of reliably preventing misconnection to the network, so that, even if the

The invention claimed is:

1. A portable device maintenance support apparatus used for a maintenance and an inspection of a hybrid communication network, a network communication of the hybrid communication network being performed based on a plurality of protocols, the network communication being performed by a compound signal in which a digital signal including at least a device information is superimposed with an analog signal, the network communication being performed between a field device and an upstream system, the portable device maintenance support apparatus comprising:
   one set of terminals for connecting to the hybrid communication network, the one set of terminals being common to the plurality of protocols;
   a plurality of communication modems configured to be used in the network communication with the field device;
   a signal processing unit configured to analyze a frequency of the compound signal, and judge a standard type of at least one of the plurality of protocols, the judgement being made based on a result of the analysis;
   a selector configured to switch a connection between the one set of terminals and the plurality of communication modems, the switch being made based on a result of the judgement by the signal processing unit; and
   a barrier circuit configured to be connected to the one set of terminals and limit an input or output energy via the one set of terminals so as not to reach an ignition energy, the barrier circuit comprising first to fourth resistances and first and second diodes, the first and second resistances being connected in series with one of the one set of terminals, the third and fourth resistances being connected in series with another of the one set of terminals, the first and second diodes being connected in parallel, with mutually opposite orientations, between the first and second resistances and the third and fourth resistances.

2. The portable device maintenance support apparatus according to claim 1, wherein
   the plurality of protocols include at least two of Foundation Fieldbus, Profibus, HART, and MODBUS.

3. The portable device maintenance support apparatus according to claim 1, wherein
   the signal processing unit is configured so that, from the plurality of protocols, when a first network protocol that is initially connected is used, the signal processing unit is configured to control an input or output current via the one set of terminals to be smaller than that of the case in which a second network protocol other than the first network protocol is used.

4. The portable device maintenance support apparatus according to claim 1,
   wherein the signal processing unit is configured to analyze the frequency for a certain period of time and calculate a communication frequency having a spectral density higher than a prescribed value and, based on a result of the calculation, to judge the standard type of the plurality of protocols.

5. The portable device maintenance support apparatus according to claim 4, further comprising:
   a control unit configured to control the portable device maintenance support apparatus, wherein
   the signal processing unit is configured to judge whether or not a first communication amplitude calculated from a maximum value and a minimum value of an input voltage to the one set of terminals is within a range of a second communication amplitude established by the standard type judged by the analysis of the frequency, and wherein
   the control unit is configured so that, when the first communication amplitude is within the range of the second communication amplitude, a communication is established with the hybrid communication network connected to the one set of terminals.

6. The portable device maintenance support apparatus according to claim 5, wherein
   the signal processing unit is configured to judge whether or not a fluctuation of a signal input or output from the one set of terminals is larger than a prescribed value, and
   the signal processing unit is configured to notify the control unit of the result of the judgment, when the fluctuation is larger than the prescribed value.

7. The portable device maintenance support apparatus according to claim 6, wherein
   the signal processing unit is configured to remove a noise component included in a signal input to the signal processing unit, to wave-shape the signal, and to output the signal to the control unit when the fluctuation is larger than the prescribed value.

8. The portable device maintenance support apparatus according to claim 1, further comprising:
   a manual switch configured to manually switch the connection of the one set of terminals to one of the plurality of communication modems.

9. The portable device maintenance support apparatus according to claim 1, further comprising:
   a measurement unit configured to detect whether or not a frame is input or output via the one set of terminals.

10. The portable device maintenance support apparatus according to claim 9, further comprising:
    a control unit configured to judge, based on the result of the analysis, whether or not a communication speed of the frame is larger than a prescribed value when the measurement unit detects the input or output of the frame.

11. The portable device maintenance support apparatus according to claim 10, wherein
    the control unit is configured to select a protocol accommodating a high-speed communication from the plurality of protocols when the control unit judges that the communication speed is greater than the prescribed value, the selection being made so that the network communication is performed using the selected protocol via the one set of terminals.

12. The portable device maintenance support apparatus according to claim 10, wherein
    the control unit is configured to select a protocol accommodating a low-speed communication from the plurality of protocols when the control unit judges that the communication speed is smaller than the prescribed value, the selection being made so that the network communication is performed using the selected protocol via the one set of terminals.

13. The portable device maintenance support apparatus according to claim 9, wherein
    the control unit is configured to select a protocol accommodating a low-speed communication from the plurality of protocols, the selection being made so that the network communication is performed using the selected protocol via the one set of terminals, the selection being made when the measurement unit does not detect the input or output of the frame.

14. A portable device maintenance support system, comprising:
- a field device detecting a physical quantity; and
- a portable device maintenance support apparatus used for a maintenance and an inspection of a hybrid communication network, a network communication of the hybrid communication network being performed based on a plurality of protocols, the network communication being performed by a compound signal in which a digital signal including at least a device information is superimposed with an analog signal, the network communication being performed between the field device and an upstream system, the portable device maintenance support apparatus comprising:
  - one set of terminals for connecting to the hybrid communication network, the one set of terminals being common to the plurality of protocols;
  - a plurality of communication modems configured to be used in the network communication with the field device;
  - a signal processing unit configured to analyze a frequency of the compound signal, and judge a standard type of at least one of the plurality of protocols, the judgement being made based on a result of the analysis;
  - a selector configured to switch a connection between the one set of terminals and the plurality of communication modems, the switch being made based on a result of the judgement by the signal processing unit; and
  - a barrier circuit configured to be connected to the one set of terminals and limit an input or output energy via the one set of terminals so as not to reach an ignition energy, the barrier circuit comprising first to fourth resistances and first and second diodes, the first and second resistances being connected in series with one of the one set of terminals, the third and fourth resistances being connected in series with another of the one set of terminals, the first and second diodes being connected in parallel, with mutually opposite orientations, between the first and second resistances and the third and fourth resistances.

15. The portable device maintenance support apparatus according to claim 1,
   wherein the signal processing unit is configured to adjust a parameter of a digital filter so as to remove a noise component included in an output signal converted by an analog/digital converter which converts, to a digital signal, an analog signal of a line voltage and a line current of the communication network, and perform a waveshaping.

16. The portable device maintenance support apparatus according to claim 1,
   wherein the signal processing unit is configured to analyze the frequency of the compound signal and, based on the result of the analysis, to judge the standard type of the plurality of protocols, and
   the barrier circuit is connected between the one set of terminals and the signal processing unit.

* * * * *